United States Patent
Mora et al.

(10) Patent No.: US 9,909,248 B2
(45) Date of Patent: Mar. 6, 2018

(54) WASHING MACHINE APPLIANCE AND LID ASSEMBLY

(71) Applicant: Haier US Appliance Solutions, Inc., Wilmington, DE (US)

(72) Inventors: Adam Raymond Mora, La Grange, KY (US); Thirugnannasambandham Venkatesan, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/209,812

(22) Filed: Jul. 14, 2016

(65) Prior Publication Data

US 2018/0016731 A1    Jan. 18, 2018

(51) Int. Cl.
| | |
|---|---|
| *A47B 77/06* | (2006.01) |
| *A47K 1/04* | (2006.01) |
| *A47L 19/02* | (2006.01) |
| *D06F 37/28* | (2006.01) |
| *D06F 39/14* | (2006.01) |
| *A47G 1/06* | (2006.01) |
| *B60J 10/70* | (2016.01) |

(52) U.S. Cl.
CPC .............. *D06F 37/28* (2013.01); *D06F 39/14* (2013.01); *A47G 1/0611* (2013.01); *B60J 10/70* (2016.02)

(58) Field of Classification Search
CPC .......... D06F 37/28; D06F 39/18; D06F 39/14; F16B 12/44; A47B 96/062; A47B 96/00; A47G 1/0611; B60J 10/70; E06B 2003/6264; E06B 2003/6244

USPC .................................................. 312/228, 408
See application file for complete search history.

(56) References Cited

U.S. PATENT DOCUMENTS

| | | | | |
|---|---|---|---|---|
| 2,934,801 A | * | 5/1960 | Blaszkowski | E06B 3/24 52/204.595 |
| 3,363,390 A | * | 1/1968 | Crane | E06B 3/22 108/43 |
| 3,426,493 A | * | 2/1969 | Aspaas | E04B 2/92 52/204.591 |
| 3,514,916 A | * | 6/1970 | Hoverman | E06B 3/62 428/125 |
| 3,940,898 A | * | 3/1976 | Kaufman | E06B 3/62 428/34 |
| 3,978,554 A | * | 9/1976 | Miller, Jr. | A47G 1/0605 24/458 |

(Continued)

FOREIGN PATENT DOCUMENTS

| | | |
|---|---|---|
| CN | 1540078 A | 10/2004 |
| CN | 204080478 U | 1/2015 |

*Primary Examiner* — Daniel J Troy
*Assistant Examiner* — Timothy M Ayres
(74) *Attorney, Agent, or Firm* — Dority & Manning, P.A.

(57) ABSTRACT

A washing machine appliance and lid assembly is provided. Washing machine may include a cabinet, a basket, and a door. The cabinet may define an opening. The basket may be mounted within the cabinet. The basket may define a wash chamber beneath the opening to receive one or more clothing articles to be washed. Door may be pivotally attached to the cabinet. The door may be selectively movable between an open position permitting access to the opening and a closed position restricting access to the opening. The door may include an integral frame and a discrete panel. The integral frame may define an aperture above the wash chamber.

18 Claims, 7 Drawing Sheets

(56) References Cited

U.S. PATENT DOCUMENTS

| | | | | |
|---|---|---|---|---|
| 4,283,870 A * | 8/1981 | Stetler | A47G 1/0605 | 40/780 |
| 4,512,095 A * | 4/1985 | Seely | A47G 1/0611 | 40/647 |
| 4,519,152 A * | 5/1985 | Seely | G09F 15/0018 | 40/791 |
| 4,523,400 A * | 6/1985 | Seely | A47G 1/0611 | 40/647 |
| 4,738,426 A * | 4/1988 | Bessinger | A47K 1/08 | 108/152 |
| 4,934,541 A * | 6/1990 | Bussan | F25D 25/02 | 108/27 |
| 5,064,158 A * | 11/1991 | Brazier | A47B 96/063 | 108/152 |
| 5,199,201 A * | 4/1993 | Vilims | A47G 1/0605 | 40/757 |
| 5,551,352 A * | 9/1996 | Meier | A47B 13/083 | 108/157.18 |
| 6,223,497 B1 * | 5/2001 | Ohtake | B29C 45/14434 | 49/490.1 |
| 6,601,330 B2 * | 8/2003 | Dusink | A47G 1/0611 | 40/791 |
| 6,766,596 B1 * | 7/2004 | Bienick | D06F 39/14 | 34/601 |
| 6,928,776 B2 * | 8/2005 | Hornung | E06B 3/24 | 156/107 |
| 7,275,346 B2 | 10/2007 | Bienick | | |
| 8,267,488 B2 * | 9/2012 | Chen | A47B 96/00 | 312/227 |
| 8,529,000 B2 * | 9/2013 | Lim | B29C 65/08 | 312/408 |
| 8,534,783 B2 * | 9/2013 | Nash | F25D 25/02 | 108/108 |
| 8,596,205 B2 * | 12/2013 | Driver | A47B 95/043 | 108/108 |
| 8,851,307 B2 * | 10/2014 | Lefevre | A47B 96/062 | 108/108 |
| 2006/0090523 A1 * | 5/2006 | Lyu | D06F 37/28 | 68/3 R |
| 2011/0001416 A1 * | 1/2011 | Escalettes | A47B 96/021 | 312/408 |

* cited by examiner

WASHING MACHINE APPLIANCE AND LID ASSEMBLY

FIELD OF THE INVENTION

The present disclosure relates generally to washing machine appliances, and more particularly to lid assemblies for washing machine appliances.

BACKGROUND OF THE INVENTION

Washing machine appliances generally include a cabinet having a tub for containing wash fluid, e.g., water and detergent, bleach, and/or other fluid additives. A basket is rotatably mounted within the tub and defines a wash chamber for receipt of articles for washing. During operation of such washing machine appliances, wash fluid is directed into the tub and onto articles within the wash chamber of the basket. The basket and/or an agitation element can rotate at various speeds to, e.g., agitate articles within the wash chamber, wring wash fluid from articles within the wash chamber, etc.

A lid assembly is generally provided to allow a user to selectively access the wash chamber of the basket. For example, the lid assembly may be movable between an open position, wherein a user can add or remove clothes from the wash chamber, and a closed position, wherein the washing machine appliance may be operable to wash the clothes or other articles positioned within the wash chamber.

Lid assemblies in certain washing machine appliances are occasionally provided with a glass window allowing a user to, e.g., look into the wash chamber of the basket when the lid assembly is in the closed position. Such lid assemblies generally include a multi-piece plastic frame housing the glass pane and attached to the cabinet of the wash machine appliance. With such a configuration, significant weight and material is often necessary to ensure that the frame will be sufficiently rigid and remain attached once assembled. Moreover, forces on the lid assembly, over time, can cause creep of the plastic perimeter frame and/or fracture the perimeter frame.

Accordingly, a more durable lid assembly including a transparent panel would be beneficial. More particularly, a lid assembly including a lightweight frame that is resistant to creep and/or fractures would be particularly useful.

BRIEF DESCRIPTION OF THE INVENTION

Aspects and advantages of the invention will be set forth in part in the following description, or may be obvious from the description, or may be learned through practice of the invention.

In one aspect of the present disclosure a washing machine appliance is provided. Washing machine may include a cabinet, a basket, and a door. The cabinet may define an opening. The basket may be mounted within the cabinet. The basket may define a wash chamber beneath the opening to receive one or more clothing articles to be washed. Door may be pivotally attached to the cabinet. The door may be selectively movable between an open position permitting access to the opening and a closed position restricting access to the opening. The door may include an integral frame and a discrete panel. The integral frame may define an aperture above the wash chamber. The integral frame may include a bottom wall, an outer wall, and a pivotable tab. A bottom surface of the bottom wall may face the cabinet in the closed position. The outer wall may extend above the bottom wall in a vertical direction. The pivotable tab may be positioned above the bottom wall and between the outer wall and the aperture. An internal cavity may be defined between the bottom wall and the pivotable tab. The discrete panel may be disposed on the pivotable tab. The discrete panel may extend across the aperture such that the discrete panel is bounded by the outer wall of the integral frame.

In another aspect of the present disclosure a washing machine appliance is provided. Washing machine may include a cabinet, a basket, and a door. The cabinet may define an opening. The basket may be mounted within the cabinet. The basket may define a wash chamber beneath the opening to receive one or more clothing articles to be washed. Door may be pivotally attached to the cabinet. The door may be selectively movable between an open position permitting access to the opening and a closed position restricting access to the opening. The door may include an integral frame and a discrete panel. The integral frame may define an aperture above the wash chamber. The integral frame may include a bottom wall, an outer wall, and a deck. A bottom surface of the bottom wall may face the cabinet to selectively rest thereon in the closed position. The outer wall may extend above the bottom wall in a vertical direction. The deck may be positioned above the bottom wall between the outer wall and the aperture. An enclosed internal cavity may be defined between the bottom wall and the deck. The discrete panel may be disposed on the deck and extend across the aperture such that the discrete panel is bounded by the outer wall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
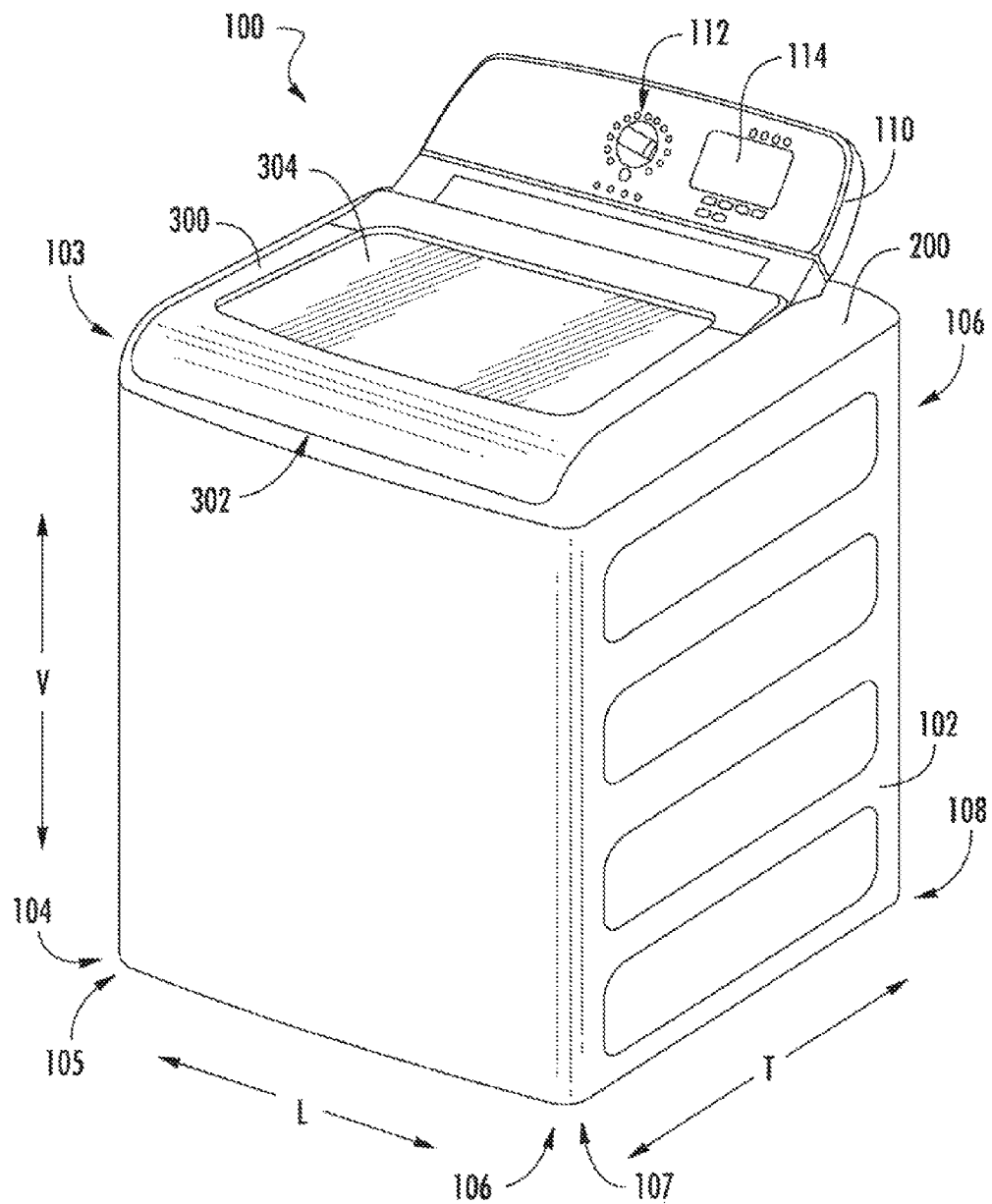
FIG. 1 provides a perspective view of a washing machine appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter provides a washing machine appliance that includes an integral frame. The frame may hold a mounted panel, such as a transparent glass window, above a basket for clothes to be washed by the washing machine appliance. The frame may also include a hollow cavity above which the panel is mounted.

Figure 2:
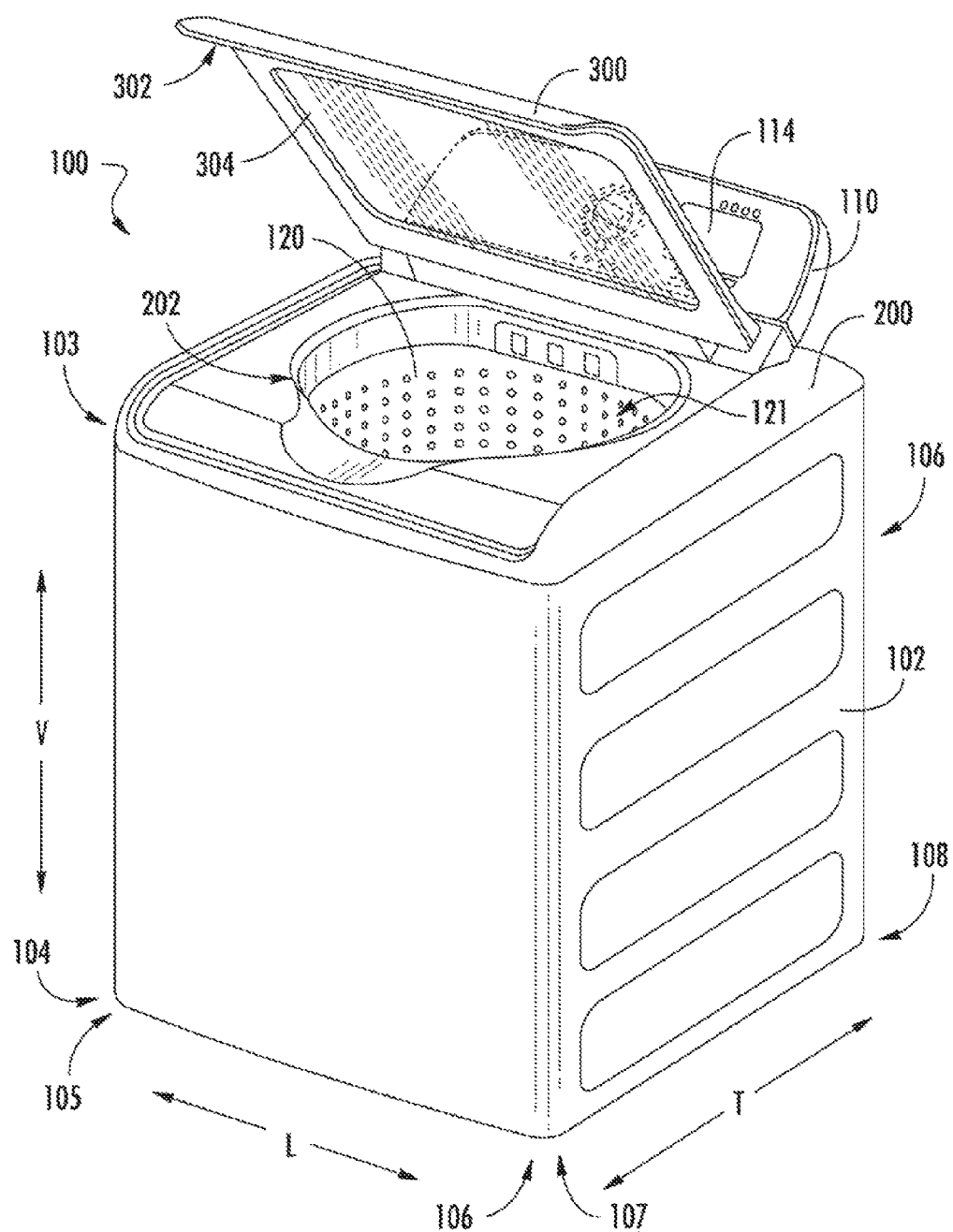
FIG. 2 provides a perspective view of the exemplary washing machine appliance of FIG. 1 with the door shown in an open position.

FIGS. 1 and 2 illustrate an exemplary embodiment of a vertical axis washing machine appliance 100. In FIG. 1, a lid assembly or door 300 is shown in a closed position. In FIG. 2, door 300 is shown in an open position. While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well.

As may be seen in FIGS. 1 and 2, washing machine appliance 100 has a cabinet 102 that defines a vertical direction V, a lateral direction L and a transverse direction T. The vertical direction V, lateral direction L, and transverse direction T are all mutually perpendicular and form an orthogonal direction system. Generally, cabinet 102 extends between a top portion 103 and a bottom portion 104 along the vertical direction V. Cabinet 102 also extends between a first side portion 105 and a second side portion 106, e.g., along the lateral direction L, and a front portion 107 and a back portion 108, e.g., along the transverse direction T.

A wash basket 120 is rotatably mounted within cabinet 102, e.g., within a wash tub (not shown) disposed within cabinet 102. A motor (not shown) is in mechanical communication with wash basket 120 in order to selectively rotate wash basket 120, e.g., during an agitation or a rinse cycle of washing machine appliance 100. Wash basket 120 defines a wash chamber 121 that is configured for receipt of articles for washing. An agitator or impeller (not shown) extends from wash basket 120 into wash chamber 121. The impeller assists agitation of articles disposed within wash chamber 121 during operation of washing machine appliance 100.

Cabinet 102 of washing machine appliance 100 has a top panel 200 positioned at or adjacent top portion 103 of cabinet 102. Top panel 200 defines an opening 202 that permits user access to wash chamber 121 of wash basket 120. Door 300 is pivotally attached to top panel 200. However, alternatively, door 300 may be mounted to cabinet 102 or another suitable support. Door 300 selectively rotates about a pivot axis between the closed position shown in FIG. 1 and the open position shown in FIG. 2. In the closed position, door 300 inhibits access to wash chamber 121. Conversely, in the open position, a user can access wash chamber 121. Door 300 also includes a handle 302 that, e.g., a user may pull and/or lift when opening and closing door 300.

Door 300 includes an integral frame 306 that defines an aperture 308 above the wash chamber 121. A discrete panel 304 extends across the aperture 308 such that panel 304 is bounded by a portion of integral frame 306 and restricts access through door 300. In some embodiments, panel 304 is configured as a window. For instance, panel 304 may be embodied as a transparent plastic or glass pane. In such embodiments, panel 304 may permit viewing of wash chamber 121 when door 300 is in the closed position, e.g., during operation of washing machine appliance 100.

As shown in FIGS. 3 through 10, door 300 defines a vertical direction V', a lateral direction L', and a transverse direction T'. The vertical direction V', lateral direction L', and transverse direction T' are all mutually perpendicular and form a secondary orthogonal direction system. Door 300 extends between a top portion 310 and a bottom portion 312 along the vertical direction V', and a first side portion 314 and a second side portion 316, e.g., along the lateral direction L'. Door 300 also extends between a rear end 318 proximate the door pivot axis PA and a front end 322 opposite the door pivot axis PA, e.g., along the transverse direction T'. When door 300 is in the closed position, the secondary vertical direction V', lateral direction L', and transverse direction T' may be substantially parallel to the corresponding vertical direction V, lateral direction L, and transverse direction T defined by cabinet 102 (see FIG. 2).

Figure 3:
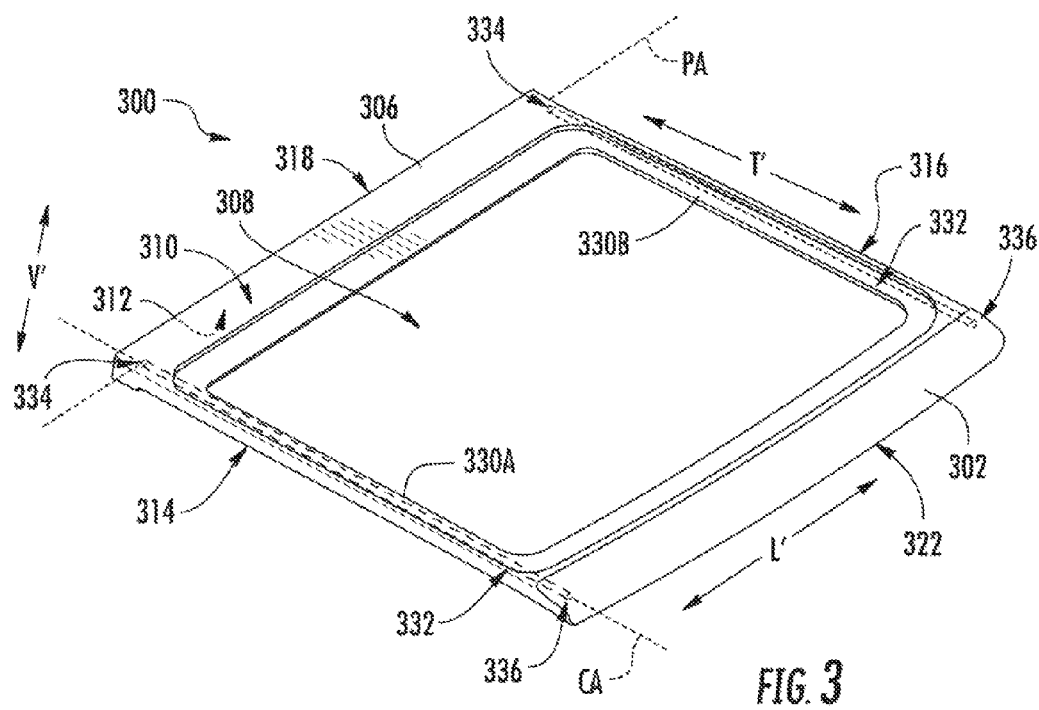
FIG. 3 provides a perspective view of an appliance door frame according to an exemplary embodiment of the present disclosure.
Figure 4:
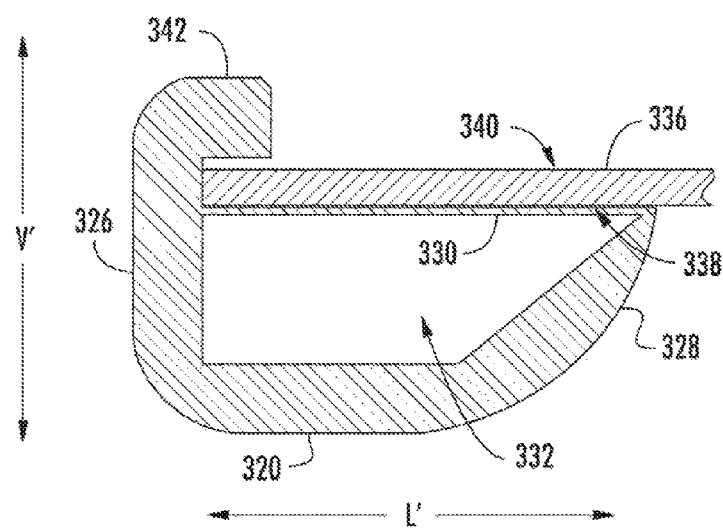
FIG. 4 provides a cross-sectional view of an internal cavity of the exemplary appliance door frame of FIG. 3 with a panel attached thereto.

Turning to FIGS. 3 and 4, integral frame 306 includes a bottom wall 320, an outer wall 326, an inner wall 328, and a deck 330. Bottom wall 320 has a bottom surface that faces the cabinet (see FIG. 2) to selectively rest thereon in the closed position. Outer wall 326 extends above bottom wall 320 in the vertical direction V', while deck 330 is positioned over bottom wall 320 along the transverse direction T' and above bottom wall 320 in the vertical direction V'. Between bottom wall 320 and deck 330, an enclosed internal cavity 332 is defined. When assembled, outer wall 326, bottom wall 320, inner wall 328, and deck 330 effectively enclose the internal cavity 332 about a cavity axis CA. In some exemplary embodiments, cavity axis CA is parallel to transverse direction T'.

As shown in FIG. 3, certain exemplary embodiments include multiple internal cavities 332. For instance, at least two internal cavities 332 are defined at opposite lateral sides, e.g., first side portion 314 and second side portion 316. In such embodiments, two separate decks 330A, 330B are provided, one at each side portion 314, 316. A shown, decks 330A, 330B are spaced apart from each other in the lateral direction L'. Aperture 308 and an additional portion of integral frame 306 extend between decks 330A, 330B, thereby separating decks 330A, 330B in the lateral direction L'. In turn, each deck 330A or 330B defines a separate internal cavity 332 between bottom wall 320 and respective deck 330A or 330B.

In some exemplary embodiments, such as the embodiment of FIGS. 3 and 4, internal cavity 332 is formed as a gas-assisted chamber. For instance, integral frame 306 may be at least partially constructed from by an injection-molded material, such as a suitable plastic. During construction of integral frame 306, e.g., while an injection-molded portion is being cooled, a compressed gas may be injected through a portion of integral frame 306, expelling an amount of molten material along the cavity axis CA. Along with forming internal cavity 332, injection of the compressed gas may form one or more openings 334, 336 through which gas and/or molten material pass. Such openings 334, 336 may be defined in communication with cavity 332 and an ambient environment. For instance, one opening 334 may be defined at a rear end 318 of integral frame 306 and cavity 332. In turn, opening 334 is defined proximate to pivot axis PA of door 300. An additional or alternative opening 336 may be defined at front end 322. As shown, opening 336 is generally positioned opposite pivot axis PA of door 300. If present, opening 336 may be covered by a discrete handle 302 attached to integral frame 306 at front end 322. Although FIG. 3 illustrates multiple openings 334, 336 in communication with internal cavity 332, alternative embodiments of cavity 332 may be formed as a sealed volume. Such embodiments of internal cavity 332 are understood to be fluid isolation from the ambient environment. Once assembled, gas contained within the sealed volume of internal cavity 332 remains therein.

When door 300 is assembled, discrete panel 304 is positioned above internal cavity or cavities 332. As shown, panel 304 is disposed on deck 330 and bounded by outer wall 326. Specifically, outer wall 326 extends above panel 304 in vertical direction V'. A bottom face 338 of panel 304 engages deck 330 and faces towards wash chamber 121 (see FIG. 2). In some embodiments, panel 304 is fixed to integral frame 306 at deck 330. For instance, in optional embodiments, a suitable adhesive is positioned on deck 330 below the bottom face 338 of panel 304. When placed thereon, bottom face 338 is then bonded to deck 330, while an upper face 340 of panel 304 faces away from wash chamber 121 (see FIG. 2). In optional embodiments, a containment rim 342 is provided on outer wall 326. Specifically, containment rim 342 extends from outer wall 326, e.g., in the lateral direction L', and across a portion of upper face 340 of panel 304.

Turning now to FIGS. 5 through 10, some embodiments of integral frame 306 include one or more pivotable tab 344 to selectively support discrete panel 304. As shown, in such embodiments, integral frame 306 includes a bottom wall 320, an outer wall 326, an inner wall 328, and at least one pivotable tab 344. Bottom wall 320 has a bottom surface that faces the cabinet (see FIG. 2) to selectively rest thereon in the closed position. Outer wall 326 extends above bottom wall 320 in the vertical direction V'. Inner wall 328 extends above bottom wall 320, at least partially in the vertical direction V'. As shown, the inner wall 328 attaches to bottom wall 320 between outer wall 326 and aperture 308, e.g., in the lateral direction L'. Pivotable tab 344 is generally positioned above bottom wall 320, between outer wall 326 and aperture 308, e.g., in the lateral direction L'. When assembled, an internal cavity 332 is defined between bottom wall 320 and pivotable tab 344 such that internal cavity 332 separates bottom wall 320 and pivotable tab 344 in the vertical direction V'.

As shown in FIGS. 5 through 10, some embodiments include multiple internal cavities 332. In the illustrated embodiments, at least two internal cavities 332 are defined at opposite lateral sides, e.g., first side portion 314 and second side portion 316. In such embodiments, two separate pivotable tabs 344A, 334B are provided, one at each side portion 314, 316, such that pivotable tabs 344A, 334B are spaced apart from each other in the lateral direction L'. Aperture 308 and an additional portion of integral frame 306 extend between pivotable tabs 344A, 334B, thereby separating pivotable tabs 344A, 334B in the lateral direction L'. In turn, each pivotable tab 344A or 334B defines a separate internal cavity 332 between bottom wall 320 and respective pivotable tab 344A or 334B.

Figure 5:
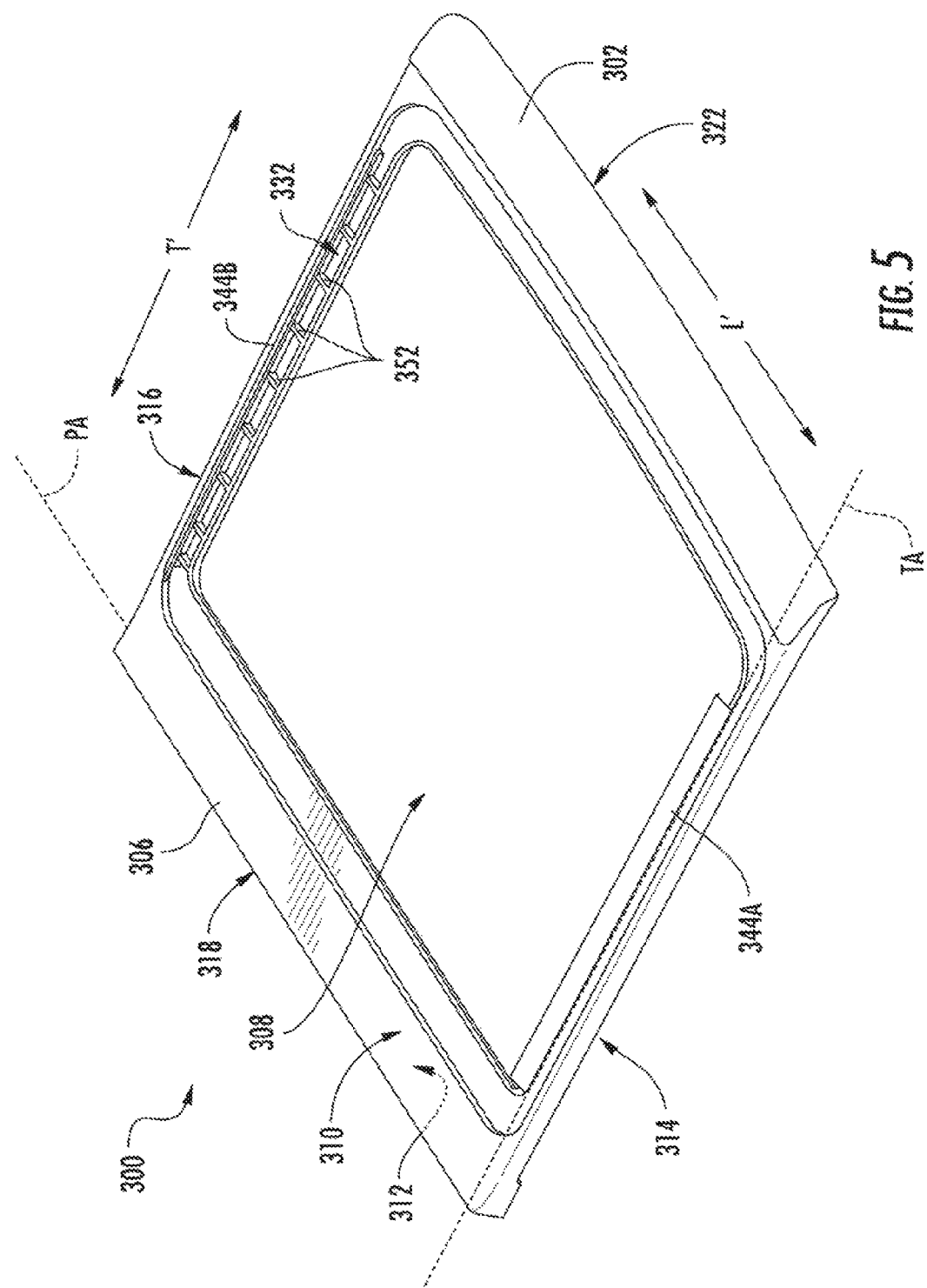
FIG. 5 provides a perspective view of an appliance door frame according to another exemplary embodiment of the present disclosure.
Figure 6:
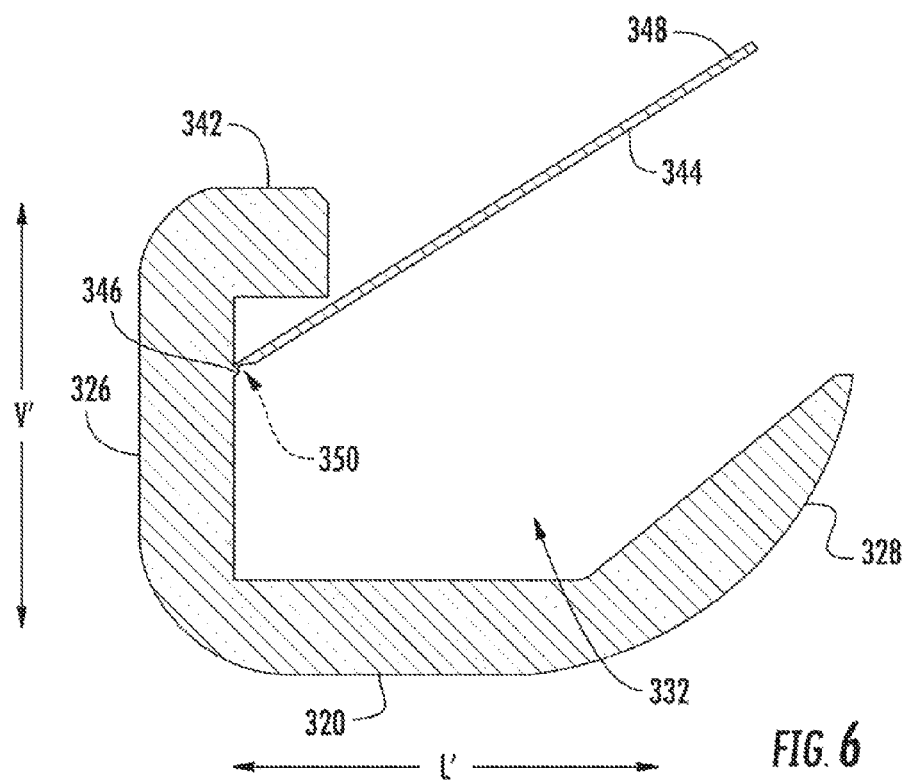
FIG. 6 provides a cross-sectional view of an internal cavity of the exemplary appliance door frame of FIG. 5.
Figure 7:
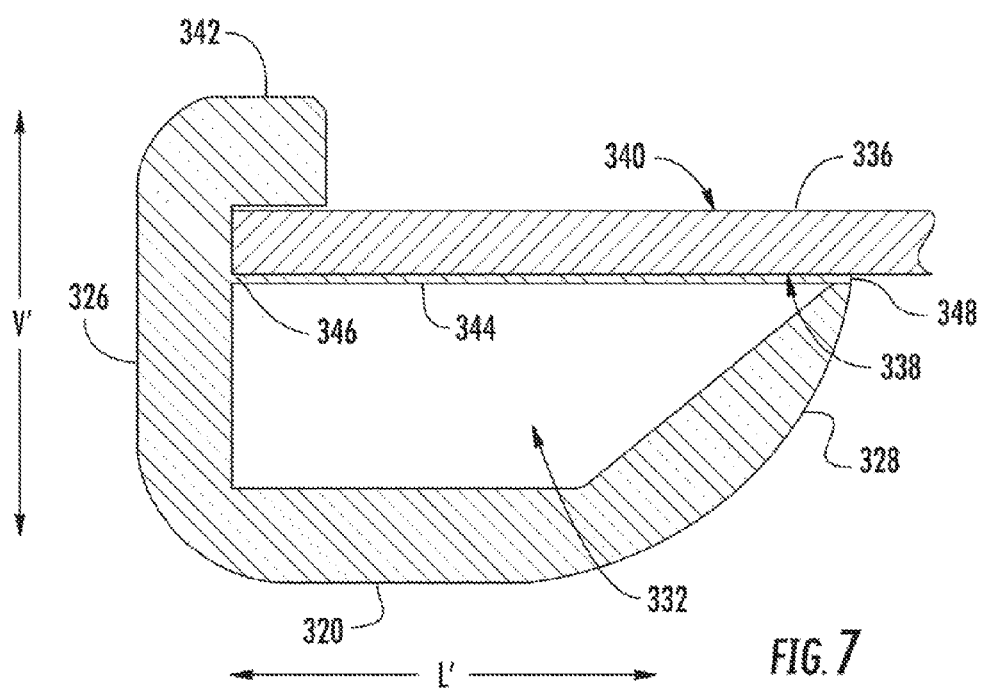
FIG. 7 provides a cross-sectional view of an internal cavity of the exemplary appliance door frame of FIG. 5 with a panel attached thereto.

As illustrated between FIGS. 5 through 7, some exemplary embodiments of pivotable tab 344 include a deformable hinge 346 joined between pivotable tab 344 and outer wall 326. In some such embodiments, deformable hinge 346 is formed along outer wall 326 such that deformable hinge 346 couples pivotable tab 344 to outer wall 326. At an opposite portion of pivotable tab 344, e.g., a distal extreme, free edge 348 is defined. As a result, deformable hinge 346 and free edge 348 are defined at opposite ends of pivotable tab 344. Along and/or adjacent to outer wall 326, deformable tab defines an optional recessed notch 350. When assembled, the notch 350 may effectively define where the deformable hinge 346 will pivot or bend. In the illustrated embodiment, notch 350 is defined between pivotable tab 344 and internal cavity 332.

Generally, deformable hinge 346 defines a tab pivot axis TA above the internal cavity 332, e.g., at notch 350 and/or a location where pivotable tab 344 is joined to outer wall 326. In optional embodiments, the tab pivot axis TA is, thus, parallel to the transverse direction T'. During assembly, pivotable tab 344 may rotate or pivot about the tab pivot axis TA to support the discrete panel 304. For instance, pivotable tab 344 may rotate between an extended positioned, as illustrated in FIG. 6, and a support position, as illustrated in FIG. 7.

In the extended position, pivotable tab 344 is angled or directed away from internal cavity 332, permitting access to internal cavity 332. Free edge 348 is held above deformable hinge 346, unattached and unengaged with another portion of integral frame 306. Pivotable tab 344 may be optionally held in this position until an engaging force or member, e.g., discrete panel 304, forces pivotable tab 344 to rotate into the support position. Once in the support position, however, pivotable tab 344 extends over internal cavity 332 such that access into internal cavity 332 is restricted, e.g., in the vertical direction V'. Free edge 348 is substantially coplanar with deformable hinge 346 in this support position. In optional embodiments, free edge 348 is rotated into engagement with inner wall 328. In additional or alternative embodiments, one or more support ribs 352 may be positioned within the internal cavity 332, below pivotable tab 344. Moreover, in further additional or alternative embodiments, one or more secondary support members, such as a screw, friction engagement snap, support tab, adhesive, or another suitable reinforcement element, may be positioned below pivotable tab 344, e.g., below the deformable hinge 346 in the vertical direction V'. When pivotable tab 344 is rotated into the support position and/or when panel 304 is placed upon pivotable tab 344, the rib(s) 352 and/or secondary support member(s) may engage an inner surface of integral frame 306 to support pivotable tab 344 and/or panel 304.

When door 300 is assembled, discrete panel 304 is positioned above internal cavity or cavities 332. As shown, discrete panel 304 is disposed on pivotable tab 344 and bounded by outer wall 326. Outer wall 326 extends above panel 304 in vertical direction V'. A bottom face 338 of panel 304 engages pivotable tab 344 and faces towards wash chamber 121 (see FIG. 2). In some embodiments, panel 304 is fixed to integral frame 306 at pivotable tab 344. For instance, in optional embodiments, a suitable adhesive is positioned on pivotable tab 344 below bottom face 338 of panel 304. When placed thereon, bottom face 338 is then bonded to pivotable tab 344, while an upper face 340 of panel 304 faces away from wash chamber 121 (see FIG. 2). In some embodiments, a containment rim 342 is provided on outer wall 326. In turn, containment rim 342 extends from outer wall 326, e.g., in the lateral direction L', and across a portion of upper face 340 of panel 304.

Figure 8:
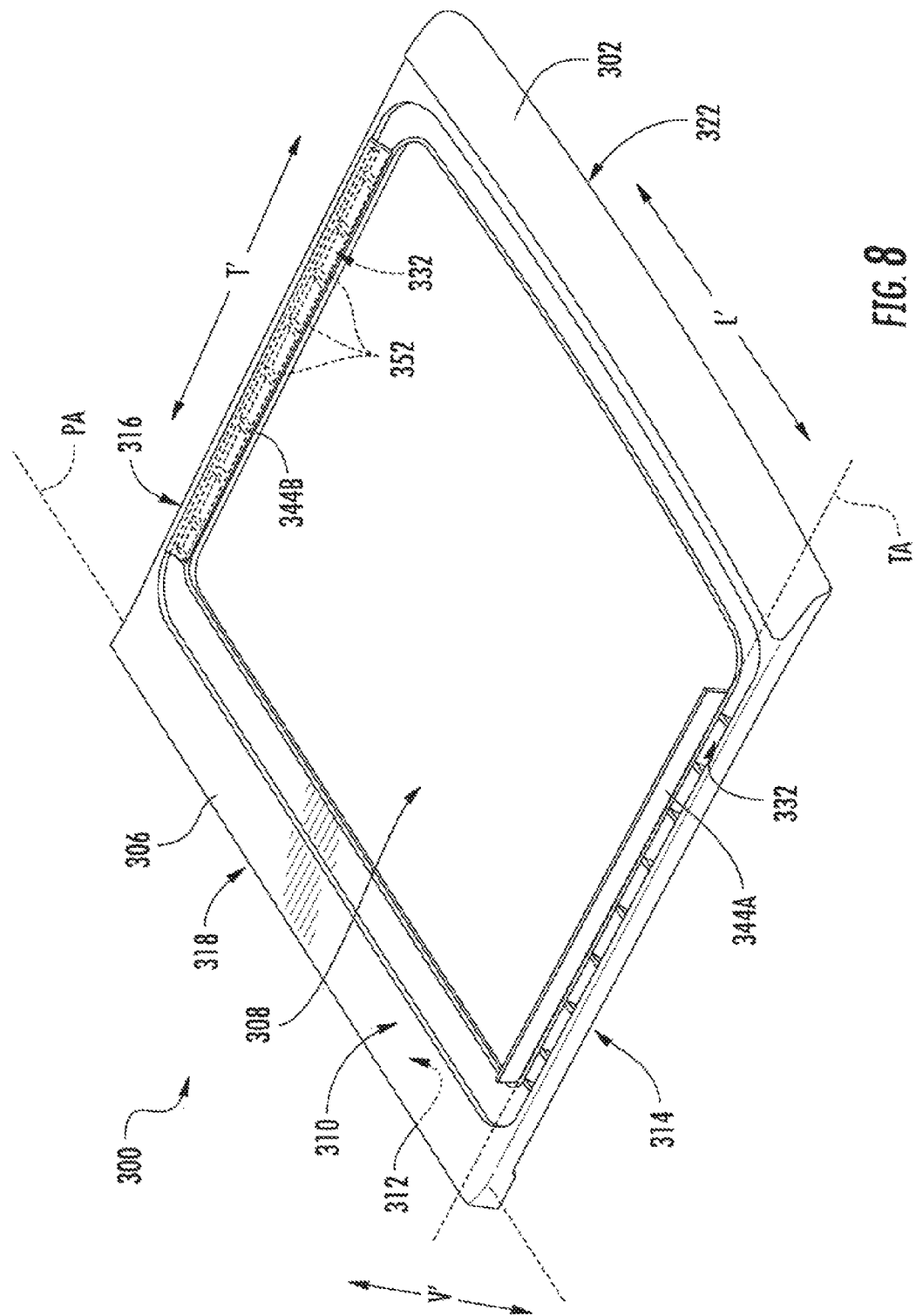
FIG. 8 provides a perspective view of an appliance door frame according to an exemplary embodiment of the present disclosure.
Figure 9:
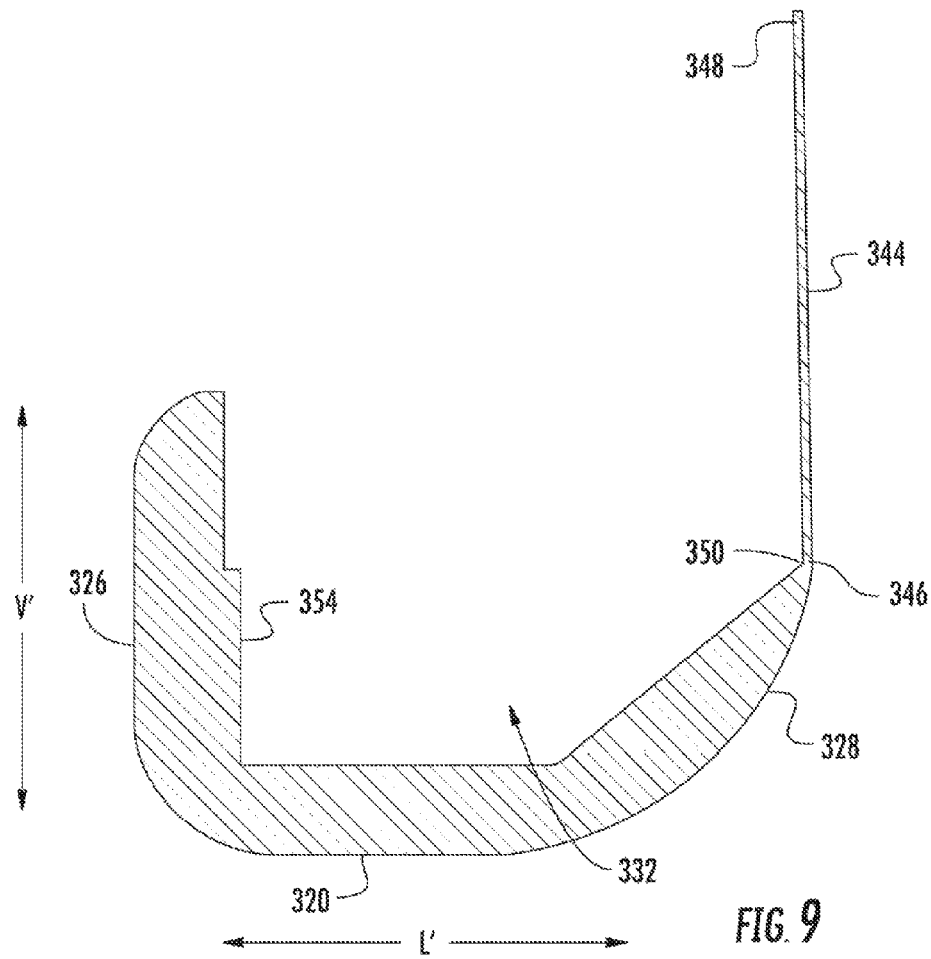
FIG. 9 provides a cross-sectional view of an internal cavity of the exemplary appliance door frame of FIG. 8.
Figure 10:
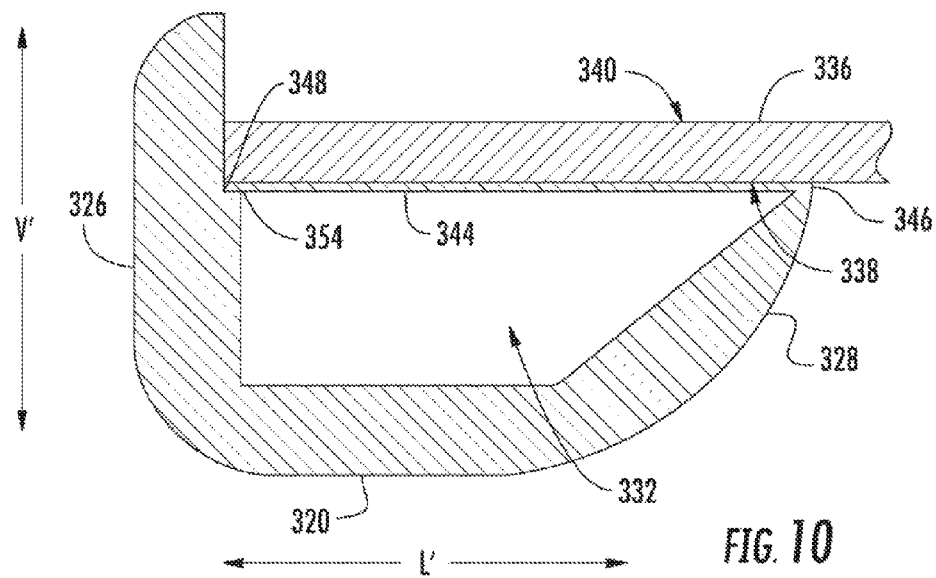
FIG. 10 provides a cross-sectional view of an internal cavity of the exemplary appliance door frame of FIG. 9 with a panel attached thereto.

Turning to FIGS. 8 through 10 other exemplary embodiments of pivotable tab 344 include a deformable hinge 346 joined between pivotable tab 344 and the inner wall 328. Generally, it is understood that the embodiments of FIGS. 8 through 10 are substantially similar to the embodiments of FIGS. 5 through 7, except as otherwise indicated. For instance, in the embodiments shown in FIGS. 8 through 10, a deformable hinge 346 is formed along inner wall 328 such that deformable hinge 346 couples pivotable tab 344 to inner wall 328. A free edge 348 of pivotable tab 344 is positioned at an opposite portion, e.g., a lateral extreme, of each pivotable tab 344.

As shown, deformable hinge 346 defines a tab pivot axis TA above the internal cavity 332, e.g., at notch 350 and/or a location where pivotable tab 344 is, thus, joined to outer wall 326. In optional embodiments, the tab pivot axis TA is parallel to the transverse direction T'. During assembly, pivotable tab 344 may rotate or pivot about the tab pivot axis TA to support the discrete panel 304. For instance, pivotable tab 344 may rotate between an extended positioned, as illustrated in FIG. 9, and a support position, as illustrated in FIG. 10.

In the extended position, pivotable tab 344 is angled or directed away from internal cavity 332, permitting access to internal cavity 332. Free edge 348 is held above deformable hinge 346, unattached and unengaged with another portion of integral frame 306. Pivotable tab 344 may be optionally held in this position until an engaging force or member, e.g., discrete panel 304, forces pivotable tab 344 to rotate into the support position. Once the support position, however, pivotable tab 344 extends over internal cavity 332 such that access into internal cavity 332 is restricted, e.g., in the vertical direction V'. Free edge 348 is substantially parallel with deformable hinge 346 in this support position. In optional embodiments, free edge 348 is rotated into engagement with outer wall 326. A ridge 354 may be defined by outer wall 326 in some embodiments, e.g., at internal cavity 332. In turn, free edge 348 may be supported on ridge 354 when pivotable tab 344 is in the support position. In additional or alternative embodiments, one or more support ribs 352 may be positioned within the internal cavity 332, below pivotable tab 344. Moreover, in further additional or alternative embodiments, one or more secondary support members, such as a screw, friction engagement snap, support tab, adhesive, or another suitable reinforcement element, may be positioned below pivotable tab 344, e.g., below the deformable hinge 346 in the vertical direction V'. When pivotable tab 344 is rotated into the support position and/or when panel 304 is placed upon pivotable tab 344, the rib(s) 352 and/or secondary support member(s) may engage an inner surface of integral frame 306 to support pivotable tab 344 and/or panel 304.

When door 300 is assembled, discrete panel 304 is positioned above internal cavity or cavities 332. As shown, panel 304 is disposed on pivotable tab 344 and bounded by outer wall 326. Specifically, outer wall 326 extends above panel 304 in vertical direction V'. A bottom face 338 of panel 304 engages deck 330 and faces towards wash chamber 121 (see FIG. 2). In some embodiments, panel 304 is fixed to integral frame 306 at pivotable tab 344. Optionally, a suitable adhesive may be positioned on pivotable tab 344 below bottom face 338 of panel 304. When placed thereon, bottom face 338 is then bonded to pivotable tab 344, while an upper face 340 of panel 304 faces away from wash chamber 121 (see FIG. 2).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine, comprising:
    a cabinet defining an opening;
    a basket mounted within the cabinet, the basket defining a wash chamber beneath the opening to receive one or more clothing articles to be washed; and
    a door pivotally attached to the cabinet, the door being selectively movable between an open position permitting access to the opening and a closed position restricting access to the opening, the door comprising
        an integral frame defining an aperture above the wash chamber, the integral frame including a bottom wall, an outer wall, and a pivotable tab, a bottom surface of the bottom wall facing the cabinet in the closed position, the outer wall extending above the bottom wall in a vertical direction, the pivotable tab positioned above the bottom wall such that the pivotable tab is separated from the bottom wall along the vertical direction, the pivotable tab being further positioned between the outer wall and the aperture, wherein an internal cavity is defined between the bottom wall and the pivotable tab separated therefrom along the vertical direction, and
        a discrete panel disposed on the pivotable tab in bonded parallel engagement therewith such that the pivotable tab is between the internal cavity and the discrete panel along the vertical direction, the discrete panel extending across the aperture such that the discrete panel is bounded by the outer wall of the integral frame,
    wherein the integral frame further includes an inner wall extending at least partially in the vertical direction above the bottom wall, the inner wall being disposed between the outer wall and the aperture, wherein the pivotable tab includes a deformable hinge extending along a tab pivot axis, wherein the deformable hinge is formed along the inner wall such that the deformable hinge couples the pivotable tab to the inner wall, wherein the pivotable tab includes a free edge positioned opposite the deformable hinge, and wherein the outer wall defines a ridge supporting the free edge of the pivotable tab.

2. The washing machine of claim 1, wherein the discrete panel includes a window through which the wash chamber is visible when the door is in the closed position.

3. The washing machine of claim 1, wherein the deformable hinge defines a recessed notch between the panel and the internal cavity.

4. The washing machine of claim 1, wherein the panel includes an upper face facing away from the wash chamber, and wherein the integral frame includes a containment rim extending from the outer wall across a portion of the upper face.

5. The washing machine of claim 1, wherein the pivotable tab is a first pivotable tab, the integral frame further comprising a second pivotable tab, wherein the first pivotable tab and the second pivotable tab are separated by the aperture in a lateral direction.

6. The washing machine of claim 1, further comprising an adhesive positioned on the pivotable tab between the panel and the pivotable tab outside of the internal cavity.

7. A washing machine, comprising:
a cabinet defining an opening;
a basket mounted within the cabinet, the basket defining a wash chamber, the wash chamber being accessible by the opening; and
a door pivotally attached to the cabinet, the door being selectively movable about a door pivot axis between an open position permitting access to the opening and a closed position restricting access to the opening, the door comprising
an integral frame defining an aperture above the wash chamber, the integral frame including a bottom wall, an inner wall, an outer wall, and a deck, a bottom surface of the bottom wall facing the cabinet to selectively rest thereon in the closed position, the outer wall extending above the bottom wall in a vertical direction, the deck positioned above the bottom wall such that the deck is separated from the bottom wall along the vertical direction, the deck being further positioned between the outer wall and the aperture, wherein an enclosed internal cavity is defined between the bottom wall and the deck separated therefrom along the vertical direction, and
a discrete panel disposed on the deck in bonded parallel engagement therewith such that the deck is between the internal cavity and the discrete panel along the vertical direction, the discrete panel extending across the aperture such that the discrete panel is bounded by the outer wall,
wherein the outer wall, bottom wall, inner wall, and deck enclose the internal cavity about a cavity axis, the cavity axis being parallel to a transverse direction, wherein the integral frame includes a rear end proximate the door pivot axis, and wherein the integral frame defines an opening in communication with the internal cavity at the rear end.

8. The washing machine of claim 7, wherein the panel includes a window through which the wash chamber is visible when the door is in the closed position.

9. The washing machine of claim 7, wherein the integral frame includes a front end positioned opposite the door pivot axis, and wherein the integral frame defines an opening in communication with the internal cavity at the front end.

10. The washing machine of claim 9, wherein the door further includes a discrete handle attached to the integral frame at the front end, the discrete handle covering the opening.

11. The washing machine of claim 7, wherein the panel includes an upper face facing away from the wash chamber, and wherein the integral frame includes a containment rim extending from the outer wall across a portion of the upper face.

12. The washing machine of claim 7, wherein the deck is a first deck defining a first enclosed internal cavity between the bottom wall and the first deck, the integral frame comprising a second deck defining a second enclosed internal cavity, and wherein the first deck and the second deck are separated by the central passage in a lateral direction.

13. A washing machine, comprising:
a cabinet defining an opening;
a basket mounted within the cabinet, the basket defining a wash chamber beneath the opening to receive one or more clothing articles to be washed; and
a door pivotally attached to the cabinet, the door being selectively movable between an open position permitting access to the opening and a closed position restricting access to the opening, the door comprising
an integral frame defining an aperture above the wash chamber, the integral frame including a bottom wall, an outer wall, and a pivotable tab, a bottom surface of the bottom wall facing the cabinet in the closed position, the outer wall extending above the bottom wall in a vertical direction, the pivotable tab positioned above the bottom wall such that the pivotable tab is separated from the bottom wall along the vertical direction, the pivotable tab being further positioned between the outer wall and the aperture, wherein an internal cavity is defined between the bottom wall and the pivotable tab separated therefrom along the vertical direction, and
a discrete panel disposed on the pivotable tab in bonded parallel engagement therewith such that the pivotable tab is between the internal cavity and the discrete panel along the vertical direction, the discrete panel extending across the aperture such that the discrete panel is bounded by the outer wall of the integral frame,
wherein the integral frame further includes an inner wall extending at least partially in the vertical direction above the bottom wall, the inner wall being disposed between the outer wall and the aperture, and wherein the deformable hinge is formed along the outer wall, and wherein the pivotable tab includes a free edge positioned opposite the deformable hinge and engaging the inner wall.

14. The washing machine of claim 13, wherein the discrete panel includes a window through which the wash chamber is visible when the door is in the closed position.

15. The washing machine of claim 13, wherein the deformable hinge defines a recessed notch between the panel and the internal cavity.

16. The washing machine of claim 13, wherein the panel includes an upper face facing away from the wash chamber, and wherein the integral frame includes a containment rim extending from the outer wall across a portion of the upper face.

17. The washing machine of claim 13, wherein the pivotable tab is a first pivotable tab, the integral frame further comprising a second pivotable tab, wherein the first pivotable tab and the second pivotable tab are separated by the aperture in a lateral direction.

18. The washing machine of claim 13, further comprising an adhesive positioned on the pivotable tab between the panel and the pivotable tab outside of the internal cavity.

* * * * *